United States Patent [19]

Nakaya

[11] Patent Number: 4,781,091

[45] Date of Patent: Nov. 1, 1988

[54] CONVEYOR SYSTEM FOR CONVEYING VENEER SHEETS WITH SPACINGS THEREBETWEEN

[75] Inventor: Takashi Nakaya, Onbu, Japan

[73] Assignee: Meinan Machinery Works, Inc., Japan

[21] Appl. No.: 41,069

[22] Filed: Apr. 1, 1987

Related U.S. Application Data

[62] Division of Ser. No. 867,427, May 15, 1986, Pat. No. 4,681,002, which is a division of Ser. No. 703,542, Feb. 20, 1985, abandoned.

[30] Foreign Application Priority Data

Feb. 22, 1984 [JP] Japan .................................. 59-25147

[51] Int. Cl.[4] ........................ B65H 35/08; B65G 47/86

[52] U.S. Cl. ........................................ 83/107; 83/154; 83/156; 83/346; 198/441; 198/693; 271/18.3; 271/280

[58] Field of Search ................. 83/346, 107, 106, 102, 83/154, 156; 198/693, 440, 441, 692; 271/282, 18.3, 280

[56] References Cited

U.S. PATENT DOCUMENTS

| | | | |
|---|---|---|---|
| 1,764,280 | 6/1930 | Randolin | 83/107 |
| 1,983,708 | 12/1934 | Ruble et al. | 271/282 |
| 2,499,570 | 3/1950 | Crafts | 83/107 |
| 2,971,414 | 2/1961 | Owen | 83/106 |
| 3,836,022 | 9/1974 | Ims | 198/693 |
| 4,270,910 | 6/1981 | Himmelsbach | 83/107 |

*Primary Examiner*—E. R. Kazenske

*Assistant Examiner*—Eugenia A. Jones

*Attorney, Agent, or Firm*—Murray and Whisenhunt

[57] ABSTRACT

A conveyor system for conveying veneer sheets with spacings therebetween comprising a sheet supply conveyor for feeding a train of cut veneer sheets of a predetermined length in contact with one another, the cut sheet length measured in the direction of sheet feed; at least first and second conveyors arranged downstream of the supply conveyor to carry the cut sheets; a stick-and-carry conveyor spanning between the downstream end of the supply conveyor and the upstream end of the second conveyor, the circumferential length of the stick-and-carry conveyor being equal to an even number of times the specified length of the cut sheet, the stick-and-carry conveyor having nailing, or sticking, areas and non-nailing areas arranged alternately at the interval of the specified cut sheet length, the nailing area having a large number of nails embedded therein the stick-and-carry conveyor being driven so that the front of the nailing area will meet the front end of the cut sheet at a sticking operation start position; and a separation member provided downstream of the stick-and-carry conveyor to release the cut sheet stuck and carried by the sticking area from the nails and transfer it onto the second conveyor; whereby the cut sheets corresponding to the non-nailing area are carried to the first conveyor and those corresponding to the nailing area are carried to the second conveyor, thus distributing the train of cut sheets to the first and second conveyors alternately and providing a space equal to the cut sheet length between the cut sheets carried on the first or second conveyor.

1 Claim, 4 Drawing Sheets

CONVEYOR SYSTEM FOR CONVEYING VENEER SHEETS WITH SPACINGS THEREBETWEEN

This application is a division of Ser. No. 867,427, filed May 15, 1986, now U.S. Pat. No. 4,681,002, which in turn is a divisional of Ser. No. 703,542, filed Feb. 20, 1985, now abandoned.

BACKGROUND OF THE INVENTION

The present invention relates to a conveyor system for conveying a train of cut veneer sheets supplied in contact with one another to a plurality of conveyors in turn so that they are spaced apart from one another while being carried on any of the conveyors.

In a conventional continuous process in which a large veneer sheet is cut into smaller sheets of a predetermined length by a cutter to form a train of veneer sheets contacting one another which are then stacked one upon the other, it has been necessary, in supplying the train of veneer sheets into the stacking equipment, to provide between any two veneer sheets an interval corresponding to the operation time of the stacking equipment. To describe in more detail, the conventional system requires a plurality of conveyors arranged in tier and a distributor which oscillates between the conveyors to change the path of the sheet so as to distribute the incoming train of cut veneer sheets in contact with each other to each conveyor, thereby forming spaces between the sheets. In this kind of veneer sheet distributing apparatus, however, the distributor has to be switched to the next stage conveyor before the rear end of the veneer sheet is completely on the first conveyor, in order to transfer the front end of the next veneer sheet to the next stage conveyor. Thus, if there is any discrepancy between the timings of the distributor oscillation and the transfer timing of the veneer sheet's front or rear end, the front or rear end of the sheet may be caught between the distributor and the conveyor resulting in a break of the sheet. Moreover, the speed of distribution and conveying depends largely on the timing of the distributor oscillation, so that there a limit to an effort to increase the processing speed. Similar to this equipment is a stacking equipment of the Japanese Patent Application Post Examination Publication No. 56-12485 in which one of a train of cut veneer sheets in contact with each other is held and transferred, by the stick-and-carry conveyor, to the upper one of the conveyors arranged in tier, after which a nail separation bar of the nail removing mechanism guides the front end of the sheet away from the stick-and-carry conveyor in order to release the sheet from the nails thereby transferring sheets onto respective conveyors and providing spaces between the sheets carried on the conveyor. This kind of equipment also has the similar drawback. That is, since as one of the train of cut sheets with no space between them is stuck and transferred to a specified conveyor the separation bar abuts against the sheet and guides it away from the nails, the front or rear end of the sheet is easily broken. Especially with the sheets that have partial cracks, the separation bar abutting against the sheet contributes to enlarge the cracks.

SUMMARY OF THE INVENTION

Accomplished to overcome the above drawbacks, the object of this invention is to provide a veneer sheet conveyor system which is simple in construction and which distributes to two or more conveyors at high speeds an incoming train of cut veneer sheets in contact with one another so that they are spaced apart from each other while being carried on any of the conveyors, without breaking the front or rear end of the sheets.

DETAILED DESCRIPTION OF THE EMBODIMENTS

In the following, we will describe one embodiment of the invention which, after cutting a one-piece veneer sheet into a smaller sheets of predetermined length in contact with one another, separates and convey these cut sheets with spaces between them.

Figure 1:
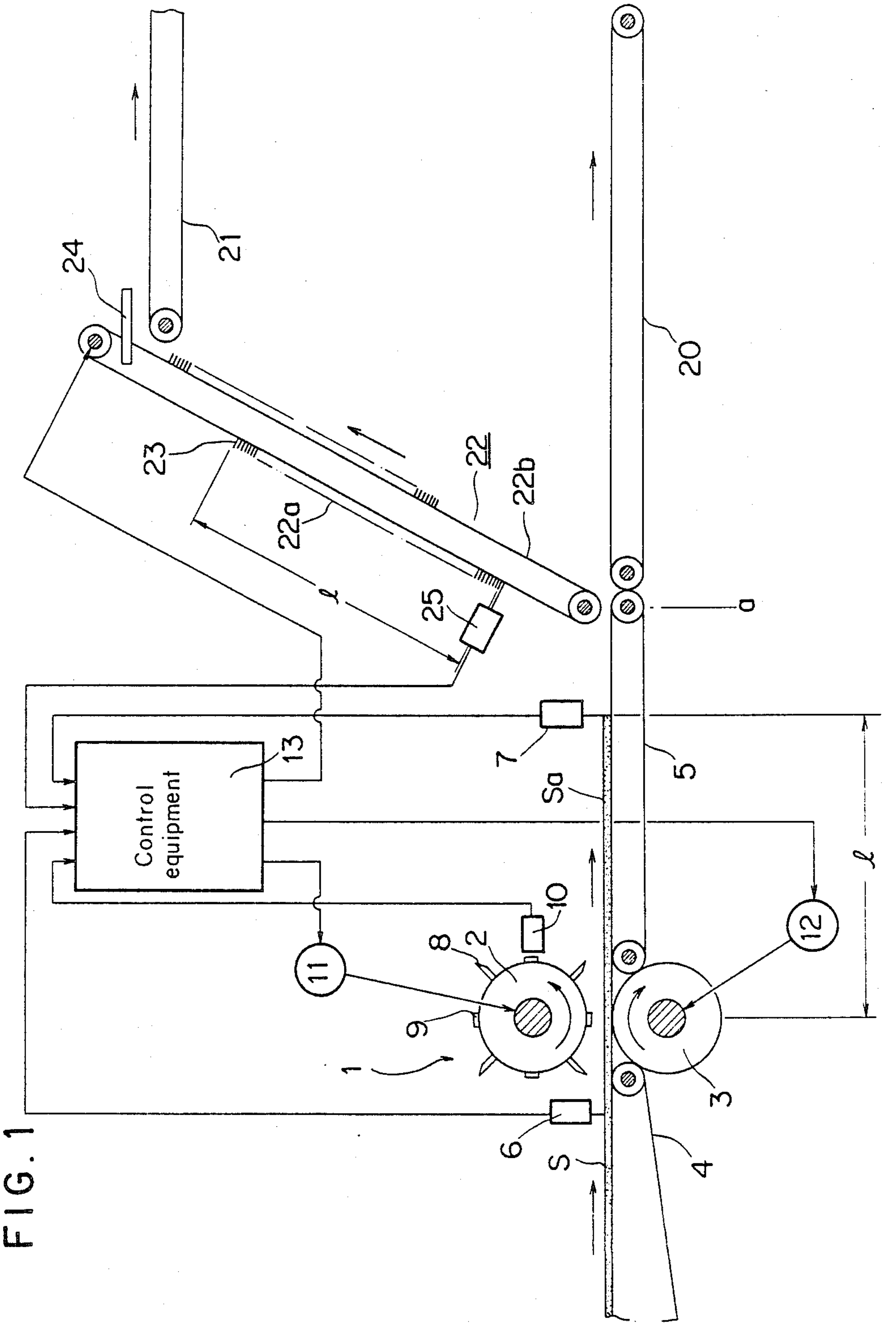
FIG. 1 is an explanatory drawng of the first embodiment showing the simplified construction.

Referring to FIG. 1, on the frame (not shown) of the rotary type cutting equipment 1 are rotatably mounted a cutter roll 2 and an anvil roll 3, both opposing each other. On the incoming side of the anvil roll 3 is installed a supply conveyor 4 which sends a one-piece veneer sheet S toward the roll 3 in the direction perpendicular to the axis of the anvil roll 3. On the delivery side of the anvil roll 3 is provided a delivery conveyor 5 which transfers further onto the following conveyors the veneer sheets Sa cut to a predetermined length. A sheet detector 6 is provided before the cutter roll 2 with respect to the direction of movement of supply conveyor 4. The sheet detector 6, as a sheet S passes it, supplies a sheet detection signal to a control equipment 13. Above the delivery conveyor 5 is provieed a cutting position detector 7 which is located a predetermined length L of the cut sheet Sa from the axis of the cutter roll 2 and anvil roll 3. The cutting position detector 7, as the front end of the original sheet S passes it, issues a position detection signal to the control equipment 13 and thereby drives the cutter roll 2 to cut the sheet S into a predetermined length.

The cutter roll 2 has four cutting blades 8 at each quarter of its circumference. Each cutting blade 8 extends along the axis of the cutter roll 2 and is arranged so that it can contact the outer circumference of the anvil roll 3. The cutter roll 2 has metallic detection objects 9 on the circumference near the axis end between the cutting blades 8. A detector 10 is provided close to one of the detection objects 9. The close-in detector 10 issues a rotation stop signal to the control equipment 13 according to a change of magnetic flux that occurs when the detection object 9 comes near it as the cutter roll 2 revolves, and the control equipment 13 then causes the cutting blades 8 to stop at the position as shown in FIG. 1. The cutter roll 2 is connected to a motor 11 through a clutch and brake mechanism (not shown). The motor 11 is driven by the control equipment 13 when the sheet detector 6 detects the sheet and the cutting position detector 7 issues the cutting position detection signal. Or the motor 11 may be driven at the interval of the intermediate conveyor's carrying time corresponding to predetermined length L of the cut sheet Sa, once the sheet detector 6 has detected the sheet and the cutting position detector 7 has issued the cutting position detection signal. The motor 11 is also stopped when the close-in detector 10 has issued a stop signal. Thus, the cutter roll 2 rotates its cutting blades 8 through about 90 degrees successively in the direction of solid arrow to cut the original veneer sheet S, which is passing under it, to a predetermined length. The anvil roll 3 is driven by a motor 12 which is rotated by the control equipment 13 when the sheet detector 6 detects the sheet and issues the sheet detecting signal. The control equipment 13 synchronizes the cutter roll 2, anvil roll 3, supply conveyor 4 and delivery conveyor 5 at almost the same speed.

A conveyor 20 is provided downstream of the delivery conveyor 5, and above this conveyor 20 is provide a second conveyor 21. It is possible to form the lower first conveyor 20 integral with the delivery conveyor 5. A stick-and-carry conveyor 22 is provided inclined extending from the delivery conveyor to the second conveyor and has a leading end downstream of the delivery conveyor and a trailing end upstream of the second conveyor. These first and second conveyors 20, 21 and stick-and-carry conveyor 22 each have a plurality of strips of conveyor belts. The control equipment 13 drives these three conveyors 20, 21, 22 according to the cutting position detection signal output from the cutting position detector 7. The stick-and carry conveyor 22 has its circumferential length equal to an even number of times the predetermined length of the sheet L (in this case four times the cut sheet length L). A nailing, or sticking, area **22*a* and a non-nailing area are formed on the conveyor 22 alternately, at intervals of the length L. The area 22*a* has a number of nails 23 embedded in the conveyor to stick out upward. These nails 23 stick the cut sheet Sa which has been transferred to the sticking operation start position a at the downstream end of the delivery conveyor 5 and carry the sheet Sa to the second conveyor 21. The length of the nailing area 22*a* and the non-nailing area 22*b* are determined almost equal to the length L of the cut sheet Sa. It is desirable to set the length of the nailing area slightly smaller than the length L. This ensures that the cut sheet Sa passing under the stick-and-carry conveyor while the non-nailing area 22*b* is moving through the position a can reliably be prevented from being stuck by the nails 23 and be allowed to pass onto the first conveyor 20. A separation bar 24 is installed on the downstream end of the stick-and-carry conveyor 22. The separation bar 24 crosses the sheet carrying side of the conveyor 22 so that the sheet Sa carried upward stuck on the nailing area 22*a* is separated from the nails 23 and transferred onto the second conveyor 21 by the separation bar 24 against which the sheet Sa is pressed. A stop position detector 25 is provided on the upper side or unloaded side of the stick-and-carry conveyor 22. The stop position detector 25 is located before the sticking operation start position a with respect to the conveyor belt traveling direction, by a distance equal to that between the sticking operation start position a and the cutting position detector 7. A predetermined time after the cutting position detector 7 shifted to the non-detecting state, the stop position detector 25 detects the front nail 23 of the nailing area 22*a* and sends to the control equipment 13 a signal to stop the stick-and-carry conveyor 22. The control equipment 13 then stops the stick-and-carry conveyor 22 so that the front end of the nailing area 22*a* is halted at a position which is a predetermined length prior to the sticking operation start position a, equal to the length from the cutting position detector 7 to the sticking operation start position a. And the control equipment 13 causes the front end of the nailing area 22*a*** to come to the sticking operation start position a at the timing that the front end of the cut sheet Sa is fed to the sticking operation start position a such that leading ends of the nailing area and the veneer sheet meet each other.

Stacking apparatuses (not shown) are provided downstream of the first and second conveyors 20, 21, respectively. These stacking apparatuses consist of an open-close conveyor and a lifter onto which the cut sheets Sa are stacked. The open-close conveyor holds the front and rear ends, with respect to the direction perpendicular to the direction of sheet transfer, of the cut sheet Sa transferred from the first and second conveyors 20, 21. The open-close conveyor, when the front end of the cut sheet Sa passes the drop position detector, is pushed open toward the direction perpendicular to the direction of transfer to release the cut sheet Sa. The upper and lower stacking apparatuses are each provided with a sheet detector before the drop position detector with respect to the sheet transfer direction. The open-lose conveyor is only opened when the sheet detector is in the detecting state and the drop position detector shifts to the detecting state. The cut sheets whose length is less than the distance between the sheet detector and the drop position detector, are thrown out of the upper and lower stacking apparatuses by the open-close conveyor since the open-close conveyor's opening action is restricted.

Figure 2:
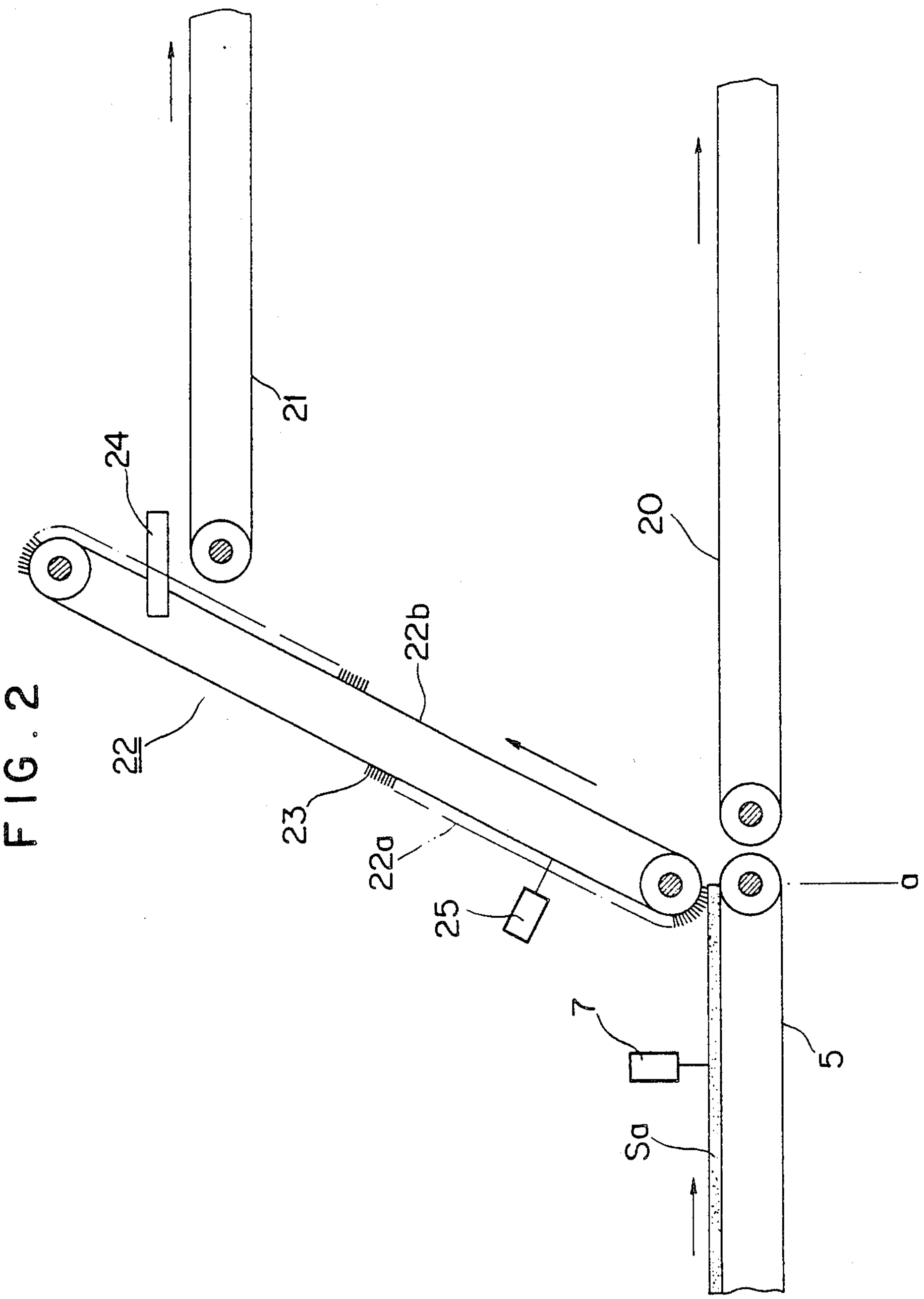
FIG. 2 is an explanatory drawing showing the cut sheet begining to be stuck with nails of the nailing area of the stick-and-carry conveyor.
Figure 3:
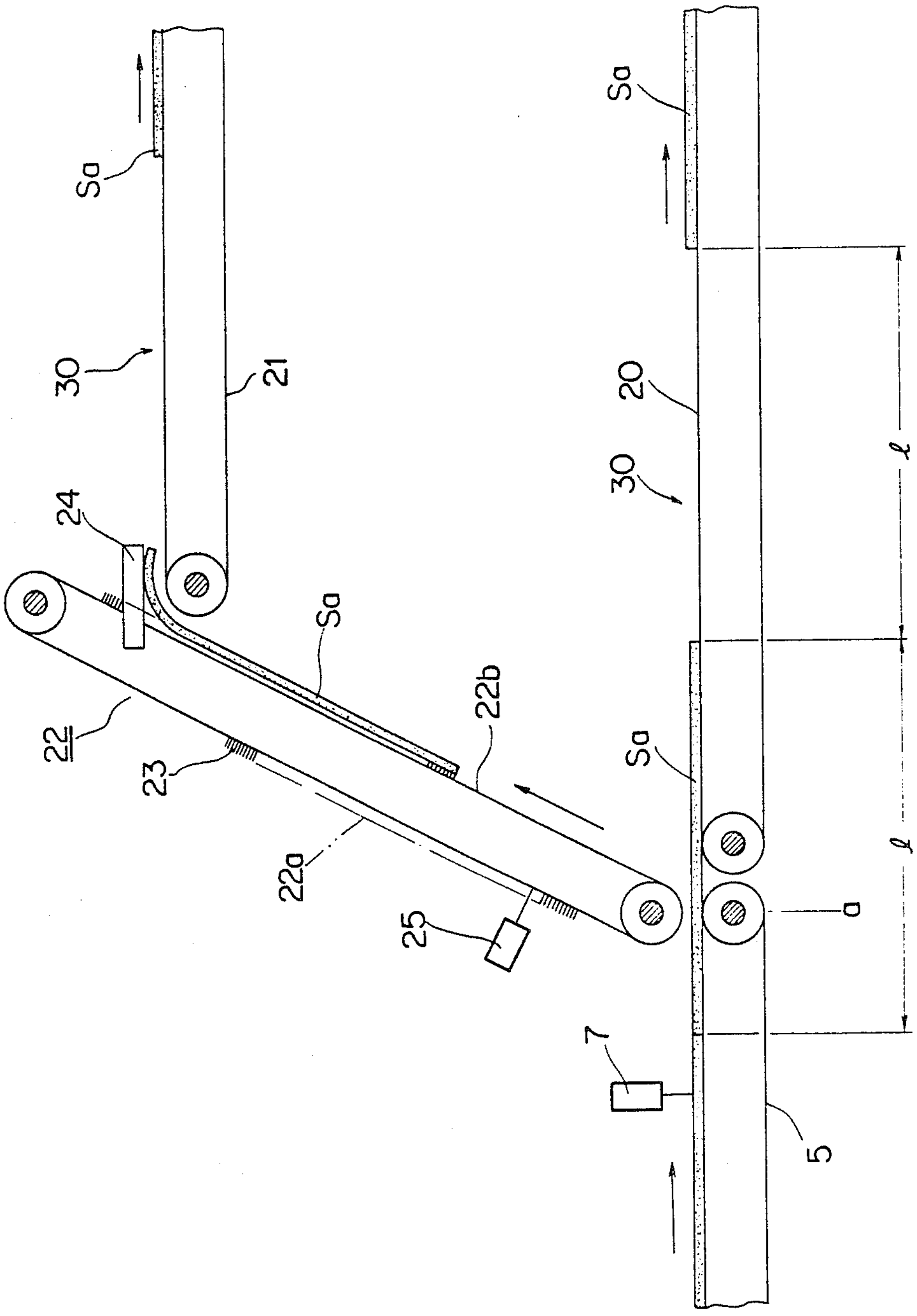
FIG. 3 is an expalanatory drawing showing the process of how the cut sheets are passed under the non-nailing area.

Next, referring to FIGS. 2 and 3 the separation and transfer action of this apparatus is described.

As the anvil roll 3, the supply conveyor 4 and the intermediate conveyor 5 are driven and the leading end of the one-piece veneer sheet S passes the cutting position detector 7, the sheet S is cut by the rotating cutter blade 8 to a predetermined length L and the cut sheet Sa is then transferred by the intermediate conveyor 5 to the sticking operation start position a. After the cutting position detector 7 goes to the detectng state, a timer is started to rotate the cutting blade 8 at a predetermined time interval which corresponds to the specified length L, with the result that the original veneer sheet S is cut into smaller sheets of the constant length L. The cut sheets Sa, in contact with one another, are forwarded to the sticking operation start position a.

When the cutting position detector 7 shifts into the detecting state, the first and second conveyors 20, 21 and the stack-and-carry conveyor 22 are driven. At this time, as shown in FIG. 2, at the timing that the front end of the cut sheet Sa is fed to the sticking operation start position a, the stick-and-carry conveyor 22 is driven so that the leading end of the nailing area **22*a* comes to the sticking operation start position a. The cut sheet Sa is stuck and held by the nails 23 of the nailing area 22*a* and transferred to the second conveyor 21. As the cut sheet Sa is carried upward reaching the upstream end of the second conveyor 21, it is abutted against the separation bar 24 and separated from the nails 23 and transferred onto the second conveyor 21. The separated cut sheet Sa is then carried by the conveyor 21** to the associated stacking apparatus.

After the cut sheet Sa is stuck and carried by the nailing area **22*a* of the stick-and-carry conveyor, the non-nailing area 22*b* comes to the stacking operation start position a as shown in FIG. 3, so that the next cut sheet Sa is prevented from being stuck with the nails 23** and is allowed to be transferred on the first conveyor 20 to the associated stacking apparatus.

As the above process is repeated, each of the train of cut sheets Sa in contact with each other is transferred either to the second and first conveyors 21, 20 by the nailing area or non-nailing area of the stack-and-carry conveyor 22. The cut sheets Sa that are transferred on the first or second conveyors 20, 21 have spaces 30 between them corresponding to the distance between the nailing area 22a and the non-nailing area 22b.

When the remainder (not shown) of the original veneer sheet S at its rear end, measuring less than the specified length L, is supplied and the cutting position detector 7 shifts to the non-detecting position, the stack-and-carry conveyor 22 continues its operation for a specified time duration. This allows the last piece of veneer sheet to be carried either by the nailing area 22a or non-nailing area 22b onto the second or first conveyor 21, 20. When the stop position detector 25 shifts to the nail detecting position as the leading end of the nailing area 22a passes the detector 25, the stack-and-carry conveyor 22 is stopped for a certain time so that the leading end of the nailing area 22a will meet the head of the next cut sheet Sa at the stack operation start position a.

In this way, with this embodiment it is possible to provide spaces 30 equal to a specified length L—the distance between the nailing area 22a and the non-nailing area 22b—between cut sheets Sa which have been supplied in contact with one another, by transferring the cut sheets to the second and first conveyors 21, 20 alternately by using the nailing area 22a and the non-nailing area 22b. Moreover, since the cut sheets Sa that have been supplied in contact with one another are distributed either to the first or lower conveyors 20, 21, they can be carried at high speeds.

Figure 4:
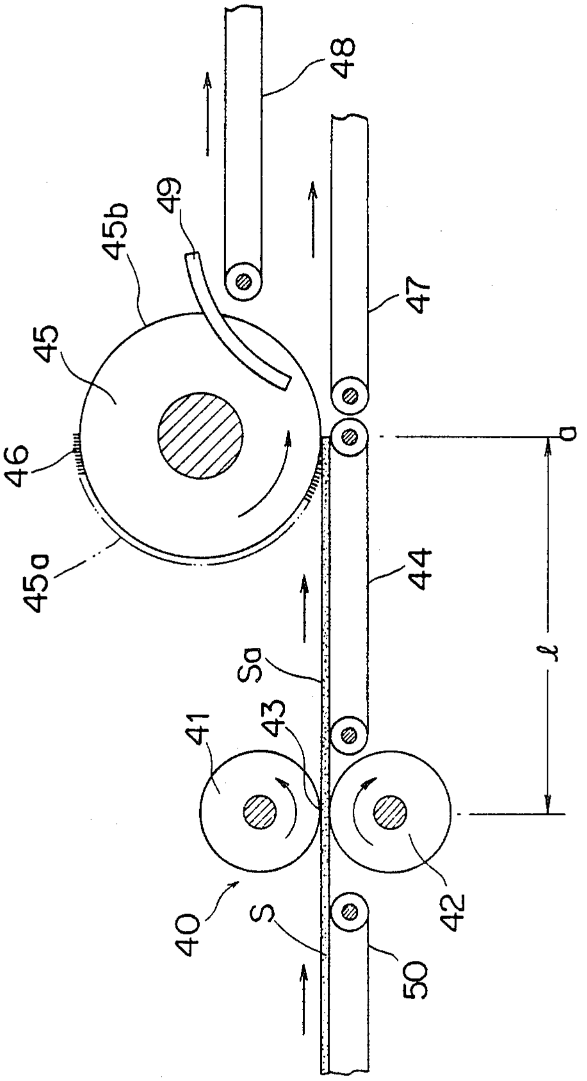
FIG. 4 is an explanatory drawing of the second embodiment of this invention.

In FIG. 4 showing a second embodiment of the invention, a cutter 40 has a pair of opposing cutter roll 41 and anvil roll 42 rotatably supported on its frame. The circumferential length of the cutter roll 41 is equal to the cut sheet Sa, or L, measured in the direction of transfer. The cutter roll 41 has a cutting blade 43 on its circumference extending along its axis. On the delivery side of the cutter roll 41 and anvil roll 42 is provided an intermediate conveyor 44 whose carrying length is an integer number of times the spacified length L (in this embodiment L). A stick-and-carry roll 45, whose circumferential length is an even number of times the specified length L (in this embodiment 2L), is provided at the downstream end of and over the intermediate conveyor 44. A plurality of stack-and-carry rolls 45 are installed at certain intervals in the direction perpendicular to the direction of sheet transfer. The stick-and-carry roll 45 has on its circumference a nailing area 45a and a non-nailing area 45b spaced the specified length L apart, the nailing area 45a being composed of a number of nails 46 embedded on the roller surface to stick and carry the cut sheet Sa. The stick-and-carry roll 45 is rotated in such a way that the front of the nailing area 45a will meet the front end of the cut sheet Sa at the sticking operation start position a. A first conveyor 47 is provided downstream of the delivery conveyor 44; and a second conveyor 48 is provided above the first conveyor 47 and on the delivery side of the stick-and-carry roll 45. The first conveyor 47 may be formed integral withthe intermediate conveyor 44. A separation member 49 is mounted to the frame. The separation member 49 crosses the delivery surface of the stick-and-carry roll 45 so that it abuts against the cut sheet Sa carried stuck on the roll 45 and separates it from the roll 45 for transfer onto the second conveyor 48. On the supply side of the cutter 40 is provided a supply conveyor 50. The supply conveyor 50, cutter 40, stick-and-carry roll 45, delivery conveyor 44, first conveyor 47 and second conveyor 48 are driven by chain or gear in synchronism with each other.

The one-piece veneer sheet S supplied from the supply conveyor 50 is cut into smaller sheets Sa of a predetermined length L by the cutter 40. The cut sheets Sa are then transferred to the sticking operation start position a. The stick-and-carry roll 45 is turned so that the front of the nailing area 45a will meet the leading end of the cut sheet at this position a. Therefore, at the sticking operation start position a the cut sheet Sa is stuck and carried by the nailing area 45a toward the second conveyor 48. The sheet Sa now engages the separation member 49 and is guided by it to be separated from the nails 46 of the roll 45 and transferred onto the second conveyor 48. The next cut sheet Sa corresponds to the non-nailing area 45b and is therefore prevented from being stuck with the nails 46 and allowed to move onto the first conveyor 47. Repetition of the above process enables each of the series of cut sheets Sa supplied in contact with one another to be distributed to the first and second conveyor 47, 48 alternately by the action of the nailing area 45a and non-nailing area 45b. The cut sheets Sa transferred onto the first or second conveyor 47, 48 are spaced the specified length L from each other.

The cut sheet less than the specified length L (not shown) is transferred onto the first or second conveyor 47, 48 by the nailing area 45a or non-nailing area 45b.

As can be seen from the foregoing, with the second embodiment of this invention, since the circumferential length of the cutter roll 41, the carrying length of the delivery conveyor 44, and the circumferential length of the stick-and-carry roll 45 are appropriaely related to the specified length L and these conveyor and rolls are rotated in synchronism, it is possible to cut a single veneer sheet S into a series of smaller sheets Sa of predetermined length in contact with each other, and distribute them alternately onto the first and second conveyors 47, 48 thereby providing spaces between the cut sheets carried on the first or second conveyor.

Although in the first embodiment, two conveyors 20, 21 are arranged in tier and the stick-and-carry conveyor is given a circumferential length equal to about four times the specified length L of the cut sheet Sa with nailing area 22a and non-nailing area 22b provided alternately, this invention is not limited to this construction. To describe in more detail, it is possible to: arrange three or more conveyors in tier construction downstream of the supply equipment; install a stick-and-carry conveyor to carry cut sheets from the delivery side of the supply equipment up toward the upstream end of each of the conveyors; set the circumferential length of the stick-and-carry conveyor to be equal to a multiple of the cut sheet length and the number of conveyors arranged in tier; provide nailing areas and non-nailing areas alternately on the stick-and-carry conveyor at the interval of the cut sheet length, the sheet length being measured in the direction of sheet feeding; provide a separation member at the upstream end of each of the conveyors in such a way that the separation member crosses the delivery surface of the stick-and-carry conveyor; and distribute among the conveyors in turn the series of cut sheets supplied in contact with one another thereby providing certain spaces between the cut sheets carried on any of the conveyors, the space corresponding to the cut sheet length multiplied by the number of conveyors.

Furthermore, it is also possible to make the density of the nails in the nailing area thicker at the front or rear end than at the intermediate region so as to reduce the trace of nails formed on the cut sheets.

Although the embodiment employs the stick-and-carry member in which nails are embedded, it is also possible to use suction in carrying and distributing the cut sheets to the conveyors. Especially with the second embodiment, forming a large number of holes in the sticking area enables the cut sheet to be attracted and carried by suction with ease.

The effect of this invention may be summarized as follows. The conveyor system of this invention comprises: a sheet supply conveyor for supplying into this apparatus a series of cut veneer sheets of a predetermined length in contact with one another, the cut sheet length measured in the direction of sheet feed; at least first and second conveyors arranged in tier downstream of the supply conveyor to carry the cut sheets toward stacking apparatuses; a stick-and-carry conveyor spanning between the downstream end of the supply conveyor and the upstream end of the second or upper conveyor, the circumferential length of the stick-and-carry conveyor being equal to an even number of times the specified sheet length, the stick-and-carry conveyor having nailing, or sticking, areas and non-nailing area arranged alternately at the interval of the specified cut sheet length, the nailing area having a large number of nails embedded therein, the stick-and-carry conveyor being driven so that the front of the nailing area will meet the front end of the cut sheet at a sticking operation start position; and a separation member provided downstream of the stick-and-carry conveyor to release the cut sheet stuck and carried by the sticking area from the nails and transfer it onto the second or upper conveyor; whereby the cut sheets corresponding to the non-nailing area are carried to the first or lower conveyor and those corresponding to the nailing area are carried to the second or upper conveyor, thus distributing the series of cut sheets to the first and second conveyors alternately and providing a space equal to the cut sheet length between the cut sheets on the first or second conveyor.

What is claimed is:

1. A conveyor system for conveying veneer sheets with spacings therebetween comprising:

supply conveyor means for supplying a one-piece veneer sheet in a predetermined direction;

rotary cutter means, operably mounted to said supply conveyor means and receivable of said one-piece veneer sheet, for cutting said one-piece veneer sheet into a plurality of veneer sheets of predetermined length measured in said predetermined direction, said plurality of veneer sheets each having a pair of sides transverse to said predetermined direction;

delivery conveyor means, operably connected to said rotary cutter means and receivable of said veneer sheets of predetermined length, for conveying said plurality of veneer sheets in said predetermined direction in side-by-side relation;

lower conveyor means, proximate to said delivery conveyor means and receivable of veneer sheets of predetermined length conveyed by said delivery conveyor means, for conveying said received sheets in said predetermined direction in spaced-apart relation, said delivery conveyor means and said lower conveyor means defining a lower veneer sheet path;

upper conveyor means for conveying veneer sheets of said predetermined length in said predetermined direction in spaced-apart relation, said upper conveyor means being disposed above said lower conveyor means and defining an upper veneer sheet path;

stick-and-carry conveyor means, disposed prior to said lower conveyor means and between said delivery conveyor means and said upper conveyor means, for picking up every other veneer sheet of said plurality of veneer sheets of predetermined length conveyed by said delivery conveyor means in said side-by-side relation and conveying said picked up veneer sheet to said upper conveyor means, said stick-and-carry conveyor means comprising a rotating roller having an axis of rotation and a circumferential length equal to an even number times said predetermined length of each veneer, said axis of rotation being disposed above said upper veneer sheet path, said roller having on the circumferential periphery thereof alternate sticking and non-sticking areas, each said area having a circumferential length substantially equal to said predetermined length of said veneer sheets, said sticking areas, upon rotaton of said roller, registering with and detachably engaging every other veneer sheet of predetermined length conveyed by said delivery conveyor means to pick up said detachably engaged veneer sheet from said delivery conveyor means and transport said picked up veneer sheet to said upper conveyor means; and separation means, operably engaging picked up veneer sheets conveyed by said stick-and-carry conveyor means, for detaching said picked up veneer sheets from said stick-and-carry conveyor means and guiding said detached veneer sheets to said upper conveyor means.

* * * * *